Nov. 19, 1935.  W. H. FARR ET AL  2,021,355

VEHICLE WHEEL

Filed May 27, 1932

INVENTOR
Warren H. Farr,
and Carolus L. Eksergian,
BY
ATTORNEY

Patented Nov. 19, 1935

2,021,355

UNITED STATES PATENT OFFICE 2,021,355

VEHICLE WHEEL

Warren H. Farr and Carolus L. Eksergian, Detroit, Mich., assignors to Budd Wheel Company, Philadelphia, Pa., a corporation of Pennsylvania Application May 27, 1932, Serial No. 613,913

8 Claims. (Cl. 301—6)

The invention relates to vehicle wheels, particularly to the type known as artillery wheels. It relates more particularly to a method of reinforcing and demountably securing an artillery wheel body to a wheel hub or brake drum.

The chief object of the invention is to reinforce a spoked wheel body in such a manner as to greatly increase its load carrying capacity. Another object is to increase and augment the driving connection afforded by the usual wheel securing means.

These and other objects of our invention have been attained by providing complementally nested rib portions on the brake drum and wheel body, whereby to reinforce the latter and to increase the driving connection.

Figure 1:
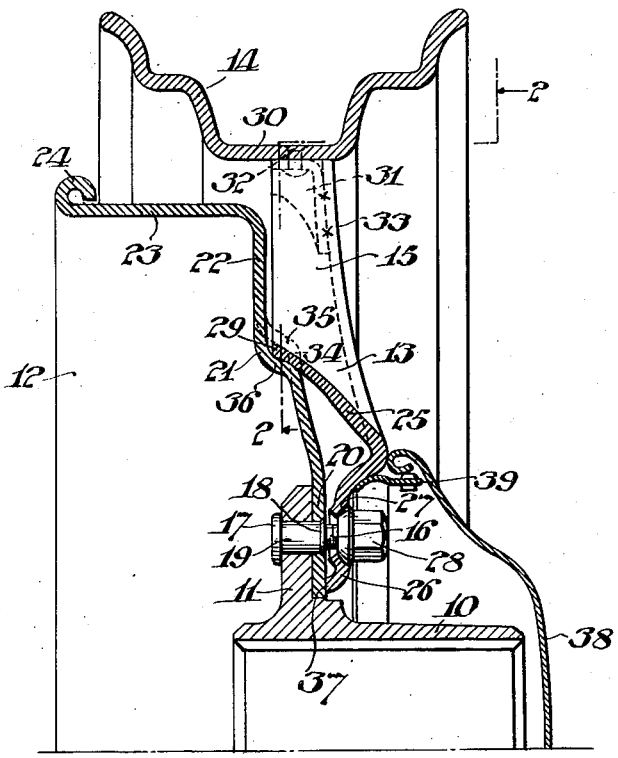

Other objects and advantages of our invention will be apparent after a reading of the subjoined specifications in light of the attached drawing, in which Figure 1 is a detailed vertical cross sectional view of the vehicle wheel embodying our invention.

Figure 2:
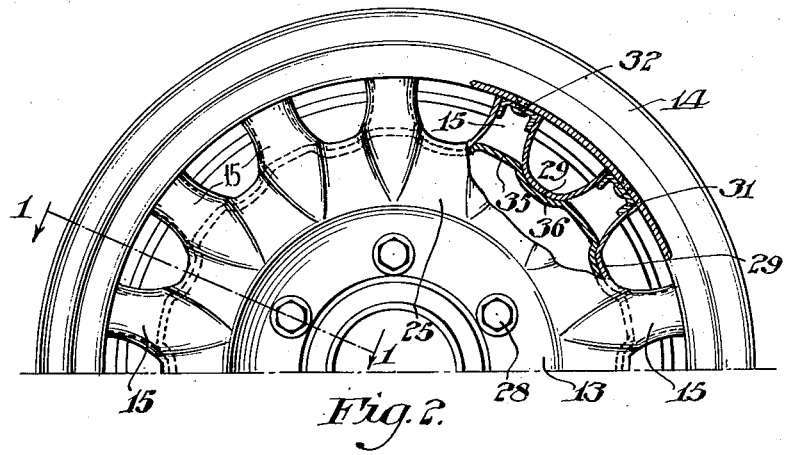

Figure 2 is a front elevational view, shown partially in section, taken on line 2—2 of Figure 1.

Referring now to the drawing by reference characters, hub 10, which fits on the usual wheel axle, not shown, is provided with a radially extending annular flange 11, upon which brake drum 12 and wheel body 13 are mounted. Rim 14 is seated on the ends of spokes 15 and is secured thereto. Hub cap 38 is demountably secured to wheel body 13 by means of spring-clips in cap retaining members 39 which are preferably welded to the wheel. The detailed arrangement of the component parts will later be described.

Recently in the art a new type of wheel has found wide spread use, due to its lightness, adaptability to design, and ease of fabrication. This type of wheel is known as a single stamping or artillery disc wheel, and commonly has spokes pressed in the metal of the wheel outwardly of a central annular nave portion. In a wheel of this type there is a noticeable tendency of the spokes to weave, due to the light gauge metal construction thereof, and accordingly the spokes must necessarily be reinforced against such weaving in order to eliminate strain and breakage. The manner in which our invention accomplishes this desired reinforcing will be apparent after reading the following detailed description thereof.

Hub flange 11 is provided with an annular series of equally spaced axially extending securing studs 16, headed on one side of the flange as at 17 and riveted as at 18. The shouldered portion 19 of the studs extends through the hub flange 11 and drum 12, these members being secured to each other permanently. Drum 12, in the present embodiment is comprised of a central radially extending securing portion 20, an axially extending intermediate portion 21, an outer radially extending portion 22, and an axially extending braking portion designated by numeral 23, terminating in a reversely curled cooling and stiffening rib 24.

Wheel body 13 is comprised of a single stamping, preferably of tapered sheet metal construction, embodying an annular nave portion 25 and a series of radially extending axially facing channel section spokes 15. According to a preferred form of our invention the outer spoke contour, as viewed in Figure 1, curves smoothly outward, to give a convex appearance to the central portion of the wheel. Radially inwardly of the nave portion 25 is provided a radially extending flange 26 embodying wheel securing holes 27, through which studs 16 pass. Cap nuts 28 demountably secure the wheel body to the studs. The nave portion 25, adjacent the inner ends of the spokes is of conical section opening rearwardly. The axially inner edge of the nave portion, designated by numeral 29 is of sinuous interrupted cross section as shown in Figure 2. This interrupted section is caused obviously by the formation of these spokes in the middle of the wheel.

The bottom 30 of the drop base portion of rim 14 is seated on the outer ends of spokes 15, and is preferably secured thereto by means of a series of separate caps 31 also of channel cross section presenting axially, and nesting closely within the ends of the spokes. We preferably rivet these caps to the rim as shown as 32 and weld the caps to the inside of the spokes as at 33. This type of joinder has been found to be entirely adequate to withstand the severe torque conditions encountered in modern road speeds.

The axially extending step 21 of the brake drum 12 is provided with an annular series of alternate ribs 34, the crests 35 and the troughs 36 of which radially adjoin the interior of the spokes and the interconnecting nave portions, respectively. This nested relationship is shown clearly in the cutaway portion of Figure 2, showing the troughs 36 nesting closely within the inner ends of the spokes. Such a provision as the foregoing renders the spokes very much more rigid than they would be if unsupported, and closes the spoke sections adjoining their bases, thereby affording a box section in this zone. The weaving tendencies of the spokes are thereby broken up to a considerable extent. By the elimination of the weaving tendency, the end connections between the spokes 15 and rim 14, afforded by caps 37 are relieved of a great many stresses which might otherwise involve the breaking away of the connection in that zone. The annular interlock afforded by the nesting ribs of the drum and the base of the wheel spokes augments the driving connection afforded by the securing studs 16, thus further rendering the wheel, as a whole, capable of adequate resistance to the most severe torque conditions. The impingement of the wheel body on the inner peripheral region 37 of the drum and on the ribs 34, give, in effect, a resilient mounting, generally similar to the well known "Michelin" mounting now in wide spread use.

It will be seen that the annular interlock afforded between the bases of the spokes and the ribbed portion of the brake drum in a very efficient manner attains the objects of the invention. The wheel is reinforced thereby, particularly in the spoke portions, and the driving connection is very greatly augmented. The advantages of such a construction are apparent, and the invention characterized by its simplicity and utility.

We are aware that many modifications of our invention may be made without departing from the spirit thereof, and we do not wish to be limited to the circumstantial terminology of the specifications but rather solely by the scope of the appended claims.

What we claim is:

1. A vehicle wheel comprising in combination, a hub having a radial flange, a pressed metal artillery type wheel body, said wheel body portion having a substantially radially extending bolting on flange for connection with the flange on the hub, a spoke bearing portion extending radially outwardly thereof having a deeply dished generally conical disc like form, and a substantially annular portion connecting said flange and spoke bearing portion and forming with said spoke bearing portion a relatively deep substantially annular channel facing axially, and spokes of deep U-section having roots pressed from said conical portion and extending from said annular connecting portion to the periphery of said conical portion being of increasing axial depth radially outwardly through said conical portion, said spokes having main bodies merging with the roots and extending therebeyond, and means on the hub axially inwardly of the bolting-on flange forming a radial and axial interlock with the periphery of the spoke bearing portion.

2. A vehicle wheel comprising in combination, a pressed metal artillery type wheel body, said wheel body having a substantially radially extending bolting on flange, a spoke bearing portion extending radially outwardly thereof having a deeply dished generally conical disc like form, and a substantially annular portion connecting said flange and spoke bearing portion and forming with said spoke bearing portion a relatively deep substantially annular channel facing axially, and spokes of deep U-section having roots pressed from said conical portion and extending from said annular connecting portion to the periphery of said conical portion being of increasing axial depth radially outwardly through said conical portion, said spokes having main bodies merging with the roots and extending therebeyond, a hub member, and a substantially radially extending flange extending outwardly from a mounting zone on said hub member, said flange having an angularly axially and radially extending ribbed portion providing cooperating nave reinforcements for said wheel body with the open U-section of said spokes.

3. In a vehicle wheel, the combination of a rim, a pressed metal artillery wheel body of the demountable bolted on type, and a brake drum having an angularly extending substantially annular portion intermediate a mounting section and braking ring section thereof, said portion having a plurality of axially extending circumferentially spaced ribs, said wheel body having a substantially radially extending bolting on flange, a spoke bearing portion extending radially outwardly thereof having a deeply dished generally conical disc like form, and a substantially annular portion connecting said flange and spoke bearing portion, and forming with said spoke bearing portion a relatively deep substantially annular channel facing axially, together with spokes having roots pressed from said conical portion and extending substantially from said annular portion to the periphery of said conical portion, and of increasing axial depth radially outwardly from said annular connecting portion to the periphery of said nave portion, said spokes having main bodies merging with the roots and extending therebeyond, and said aforementioned ribbed portions of the brake drum providing interlocking and supporting engagement for said wheel body in a zone substantially adjacent the periphery of said deep cone portion and the outer limit of said spoke root portions.

4. A vehicle wheel comprising in combination, a hub having a radial flange and an additional seat radially outwardly and axially inwardly of said flange, a wheel body having a substantially radially extending bolting-on flange, a spoke bearing portion extending radially outwardly thereof having a deeply dished generally conical disc-like form, and a substantially annular portion connecting said flange and spoke bearing portion and forming with said spoke bearing portion a relatively deep substantially annular channel facing axially, and spokes of deep U-section having roots pressed from said conical portion and extending from said annular connecting portion to the periphery of said conical portion, being of gradually increasing depth radially outwardly through said conical portion and forming at the periphery of said conical portion a deeply corrugated zone, the corrugations of said zone interfitting with corresponding formations on said additional seat on the hub and forming therewith a supporting and driving connection for the wheel body from the hub.

5. In a vehicle wheel, the combination including a hub, a rim, a brake drum mounted on the said hub having axially extending and radially projecting ribs, and a wheel body having a bolting-on flange, a deep conical nave portion, and deep axially facing channel section spokes pressed from said nave portion and interconnecting said bolting-on flange with said rim, and seated upon said ribs of said drum at the periphery of the deep conical nave, thereby forming an axial and radial interlock therewith adapted to take radial load and driving strains.

6. In a vehicle wheel including a hub and a rim, a brake drum mounted on said hub and having axially extending and radially projecting ribs, and a single stamping wheel body having a deep conical nave portion and deep axially facing channel section spokes pressed therefrom and seated partially on the ribs of said drum adjacent the periphery of said nave and forming an axial and radial interlock therewith adapted to take radial load and driving strains.

7. A vehicle wheel comprising a hub having a flange provided with axially extending and radially projecting ribs, a rim, and a single stamping wheel body having a deep conical nave portion and deep axially facing channel section spokes pressed therefrom and seated partially on the ribs of said flange adjacent the periphery of said nave and forming an axial and radial interlock therewith said radially projecting ribs extending into the channels of said spokes, and the portions intervening between said radially projecting ribs collectively constituting a seat for the deep nave portion of the wheel adapted to take radial load and driving strains.

8. In a vehicle wheel, the combination including a hub having a flange provided with axially extending and radially projecting ribs, and a bolt circle within the radial zone of said ribs, a wheel body having a bolting-on flange adapted to coact with said bolt circle in the securement of said body to the hub, a rim, a deep conical nave portion and deep axially facing channel section spokes pressed therefrom and interconnecting said bolting-on flange of the wheel body with said rim, said nave portion resting on the intervening portions occurring between the projecting ribs of the hub flange, and the radially projecting ribs themselves extending into the hollow channels of the spokes, thereby forming an axial and radial interlock adapted to take radial load and driving strains.

WARREN H. FARR.
CAROLUS L. EKSERGIAN.